United States Patent [19]
Silverman

[11] 3,790,755
[45] Feb. 5, 1974

[54] HIGH DENSITY INFORMATION SYSTEM USING MULTIPLE STRIPS

[76] Inventor: Daniel Silverman, 5969 S. Birmingham, Tulsa, Okla. 74105

[22] Filed: Dec. 8, 1970

[21] Appl. No.: 96,186

Related U.S. Application Data

[63] Continuation-in-part of Ser. No. 888,461, Dec. 29, 1969, which is a continuation-in-part of Ser. Nos. 304,789, Aug. 27, 1963, Pat. No. 3,523,183, and Ser. No. 158,000, Dec. 8, 1961, Pat. No. 3,179,001, and Ser. No. 612,698, Jan. 30, 1967, Pat. No. 3,550,085, and Ser. No. 721,998, April 17, 1968, and Ser. No. 67,135, Aug. 26, 1970, abandoned, said Ser. No. 612,698, Continuation-in-part of Ser. No. 462,679, is a continuation-in-part of Ser. No. 462,679, June 9, 1965, Pat. No. 3,322,033, which is a continuation-in-part of Ser. No. 158,000, Dec. 8, 1961, Pat. No. 3,179,001.

[52] U.S. Cl.. 235/61.11 E, 179/100.2 Z, 178/6.6 R, 179/100.2 T
[51] Int. Cl. .......... G06k 7/00
[58] Field of Search ....... 235/61.7, 61.9 A, 61.11 E, 235/61.11 D; 250/219 I; 346/76 L, 76; 179/100.2 MI, 100.2 P, 100.3 B, 100.2 T, 100.2 Z; 178/6.6 R; 340/174.1

[56] References Cited

UNITED STATES PATENTS

| | | | |
|---|---|---|---|
| 3,028,449 | 4/1962 | Power et al. | 179/100.2 T |
| 3,053,942 | 9/1962 | Backers et al. | 179/100.2 T |
| 3,578,335 | 5/1971 | Itsukiban | 179/100.2 Z |
| 3,592,975 | 7/1971 | Itsukiban | 179/100.2 Z |
| 3,617,066 | 11/1971 | Foelkel | 179/100.2 Z |
| 3,064,077 | 11/1962 | Cary | 178/6.6 R |
| 2,617,891 | 11/1952 | Karolus et al. | 179/100.3 B |
| 2,876,295 | 3/1959 | Irby | 179/100.2 T |
| 3,322,033 | 5/1967 | Silverman | 346/76 |
| 3,395,246 | 7/1968 | Stetten | 346/76 |
| 3,359,563 | 12/1967 | Stetten | 346/76 |
| 1,834,330 | 12/1931 | Brower | 346/5 X |
| 1,719,392 | 7/1929 | Cooley | 346/5 X |
| 3,055,582 | 9/1962 | Battison et al. | 235/61.11 E |
| 3,482,254 | 12/1969 | Harrison et al. | 346/76 L |
| 3,109,898 | 11/1963 | Gray | 179/100.2 MI |
| 3,293,415 | 12/1966 | Fiehl | 235/61.11 E |
| 3,410,203 | 11/1968 | Fischbeck | 346/76 |

*Primary Examiner*—Maynard R. Wilbur
*Assistant Examiner*—Joseph M. Thesz, Jr.

[57] ABSTRACT

This invention describes an information system in which the information is recorded on strip records in the form of patterns of closely spaced magnetic or high-magnification-optical spots. Transducer means are mounted in a rotating scanning assembly. The strip to be transduced is constrained to be moved longitudinally in a "strip" plane which is parallel to and precisely spaced from the plane of the scanning assembly. The longitudinal direction of the strip is radial to the scanning assembly. A plurality of strips, each in separate strip handling means are positioned radially, equally spaced around the axis of rotation of the scanning assembly. An equal number of transducer elements are equally spaced around the scanning assembly so that each strip can be transduced simultaneously or sequentially. Means are provided to record information on one strip simultaneously with the reading of information on another strip.

37 Claims, 14 Drawing Figures

Daniel Silverman INVENTOR.

Daniel Silverman INVENTOR.

Daniel Silverman INVENTOR.

HIGH DENSITY INFORMATION SYSTEM USING MULTIPLE STRIPS

CROSS INDEX

This invention is a continuation-in-part of my copending applications: Ser. No. 888,461, filed 12-29-69, entitled: Random Access Multiple Disc Information System which was a continuation-in-part of Ser. No. 304,789 entitled; Digital Microfilm Apparatus, filed Aug. 27, 1963, now U.S. Pat. No. 3,523,183, and application Ser. No. 304,789 was a continuation-in-part of the then copending application Ser. No. 158,000 filed Dec. 8, 1961, entitled; Microfilm Apparatus, now U.S. Pat. No. 3,179,001; Ser. No. 612,698, filed 1-30-67, entitled: Information System Using Arrays of Multiple Spot Patterns now U.S. Pat. No. 3,550,085; Ser. No. 721,998, filed 4-17-68, entitled: System for the Storage Retrieval and Display of Information, and my copending application Ser. No. 67,135 filed 8-26-70, entitled: Information Systems Using Arrays of Multiple Spot Patterns now abandoned. Application Ser. No. 612,698, now U.S. Pat. No. 3,550,085, was a continuation-in-part of the then copending application Ser. No. 462,679, filed June 9, 1965, now U.S. Pat. No. 3,322,033, which was a continuation-in-part of the then copending application Ser. No. 427,427, which was filed Jan. 22, 1965, now U.S. Pat. No. 3,322,030, which was a continuation-in-part of the then copending application Ser. No. 158,000 filed Dec. 8, 1961, now U.S. Pat. No. 3,179,001, entitled, Method and Apparatus for Storing on and Retrieving Information from Multiple Information Strips.

All of these prior copending applications are entered into this application by reference.

This invention is also related to my issued patents, U. S. Pat. No. 2,820,907, issued 1-21-58, entitled: Microfilm Apparatus; U.S. Pat. No. 3,179,001 issued 12-8-61, entitled: Method and Apparatus for Storing on and Retrieving Information from Multiple Information Strips; U.S. Pat. No. 3,423,743 issued 1-21-69, entitled: Random Access Magnetic Tape Memory System; U.S. Pat. No. 3,523,183, issued 8-4-70, entitled: Method and Apparatus for Storing on and Retrieving Information from Multiple High Density Information Strips; U.S. Pat. No. 3,322,030, issued 5-30-67, entitled: Method and Apparatus for Searching an Inverted File Information System; and U.S. Pat. No. 3,322,033, issued 5-30-67, entitled: Method and Apparatus for Making and Scanning Spot Patterns. Incorporate by reference into this application my U.S. Pat. No. 3,322,030.

FIELD OF THE INVENTION

This application is concerned with the storage and retrieval of information, particularly with those systems employing very high storage density. More particularly it is concerned with large capacity, multiple long-strip systems, adapted to be addressed on a random access basis. They can be digital, pictorial, or combination systems.

PRIOR ART

There is great economic interest in the development of high density storage systems for the archival storage of digital, analog and pictorial information. At the present time this is done by the use of magnetic tapes and cards and photographic cards and film. However, none of these approach the density or size of storage that is really required to make such a system practical.

In my U. S. Pat. No. 2,820,907 I suggested how the magnification of the spot reading apparatus could be increased by recording the spots in precise relation to guide indicia, which, with appropriate optical servo means could ensure that the spot pattern (or its image) would be precisely positioned onto the photo electric reading means.

Later, in my U. S. Pat. Nos. 3,179,001 and 3,423,743, I showed how a plurality of strips in a plurality of strip handling means could be operated as a system, so that by the process of dividing the long strips into separate sections, with appropriate section indicia, any desired section in the entire storage could be selected for reading on a random selection basis. This principle was applied, in U.S. Pat. No. 3,179,001 to photographic films for the storage of digital and/or pictorial information, and in U.S. Pat. No. 3,423,743 it was applied to magnetic recording systems. My U. S. Pat. No. 3,523,183 carries these principles farther to larger storage systems.

In my copending application Ser. No. 888,461, the principles are applied to a multiple spindle, multiple disc system addressable by a single transducer. These can be magnetic or optical. In particular the optical system employs recent technology in the use of a sharply focussed laser beam to burn or evaporate material, over a small area, in a thin opaque layer on a transparent plastic base strip, and thus to provide extremely small microperforations in the opaque layer. The optical properties of the perforations are sufficiently different from those of the opaque layer that the perforations (spots) can be readily detected (read) as a high magnification optical means rapidly scans the record.

Reference is made to U.S. Pat. Nos. 3,314,073, 3,314,074, 3,314,075 and 3,474,457. All of these are directed to the art of the design of high magnification optical system for the precise focussing of laser light to burn extremely small (diffraction limited) microperforations through their opaque films for purposes of data storage. Although simpler systems may be used to burn or evaporate material from thin opaque films using high energy laser beams, these patents teach how to get the smallest possible holes, and thus the highest possible information packing density. Simpler optical systems can, of course, be used to provide records of lesser packing density.

This invention is derived in part from my copending applications and earlier issued patents in a form which permits the use of multiple long information strips with means for rapid readout from a chosen strip and rapid transfer to or even simultaneous readout from separate strips.

GENERAL DESCRIPTION OF THE INVENTION

In this invention (as in my U.S. Pat. Nos. 3,179,001, 3,423,743 and 3,523,183) I use a purality of information record strips adapted to be traversed in a plurality of strip transport means. These record strips can be in the form of digital spot patterns, either optical or magnetic, or they can be pictorial spot patterns. The plurality of strip handling means are so arranged that each strip can be placed in operating relation sequentially with a reading means.

One very important improvement of this invention lies in the physical arrangement of strip handling means and scanning means such that:

1. a very precise spacing can be maintained between the transducers and the strips, 2. which permits the use of high magnification optical means with short depth of focus, and 3. rapid transfer of the reading means to each of the strips, 4. providing very short access time, on a random basis, to all information in a very large store, and, in the case of optical systems, 5. non contacting readout with negligible wear on the strip.

The objects of this invention are to provide a very large information store with rapid random access to all parts of the store, with ability to write and read simultaneously at high bit rates and low error rates.

These and other objects and a better understanding of the invention will be made clearer by the following description, taken in conjunction with the attached drawings, in which:

DESCRIPTION OF THE PREFERRED EMBODIMENTS

Figures 1, 2:
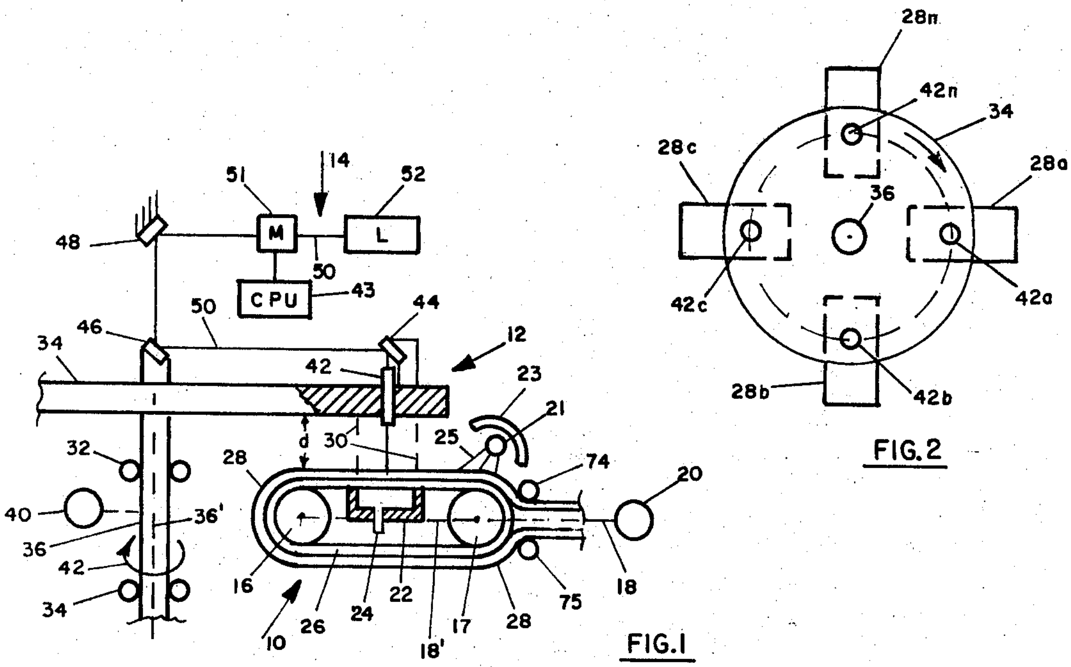
FIG. 1 illustrates schematically an optical embodiment of this invention.
FIG. 2 illustrates a variation of FIG. 1 with four record strips.

Referring now to the drawings, and in particular to FIG. 1, I show the essential elements of the strip transport or traversing means and the transducer scanning system. While this system is adapted to both optical and magnetic transduction, the preferred system is optical and for convenience the general system will be described in terms of optical transducers. Also, while the optical system is adaptable to digital and pictorial spot patterns, the general system will be described in terms of a digital storage. Also the type of information record described will, for convenience, be a laser recording medium.

The strip transport 10 comprises two parallel spaced cylinders, drums or rollers 16, 17 driven together by motor 20 through means 18 and 18′. It is contemplated that the motor will be precisely controlled to operate at a low constant speed, for writing or reading, and at a higher speed for fast traverse of the strip to locate a particular section of the strip. A tight-fitting thin steel belt (or equivalent) surrounds the rollers and runs with them. Means are provided (not shown) for altering the spacing of the cylinders so that the tension in the belt can be increased to a predetermined value. By making the spacing between the rollers small, and the belt tension high, the amplitude of flutter, or transverse motion or vibration of the belt, will be a minimum. The belt will therefore define a fixed plane, called the "strip" plane and within the strip plane will be said to have planar motion.

The belt is perforated with small holes (not shown) and a chamber 22 is mounted below and in contact with the belt, and has a connection 24 to be applied to a source of vacuum. The strip 28 is constrained by rollers 74, 75, to pass over and around the belt as shown; in the area above the chamber 22 the vacuum, effective through the perforations in the belt, will hold the strip securely to the belt and the strip will be traversed at constant speed with the belt. The strip will also be constrained to remain in the strip plane determined by the belt.

Spaced above the belt and strip is a rotating assembly 12. This comprises a circular disc (or equivalent structure) mounted perpendicular to a rotating shaft 36 constrained by bearings 32, 34 to rotate about an axis 36′ perpendicular to the plane of the strip. Thus the disc defines a transducing plane parallel to and at a predetermined adjustable constant distance *d* above the strip plane. In the disc are mounted one or more transducing elements, such as optical elements (microscope objectives) 42 with their axes parallel to the axis 36′. The positions of the optical element (or optics, or objective) 42 are adjustable (not shown) axially, so that beam 50 will be brought to a sharp focus at the surface of the strip 28.

I plan to provide a high packing density of spots on the strip, which means that the spots will have to be very small. This means that the optics will be of high magnification and the depth of focus will be short. Therefore, the design must provide for a precisely constant spacing *d* between the moving optical element and the moving strip. One way of doing this in the prior art is to wrap the strip around a drum, and constrain the reading element to traverse the strip along a longitudinal element of the drum. However, this does not provide the flexibility required for rapid transfer of the reading means from one strip to another. By making the tension in the belt 26 of FIG. 1 sufficiently high the spacing between optics and strip can be kept constant as precisely as necessary. The suction will keep the strip in contact with the belt over an area marked by the dashed lines 30, which encloses the optical elements 42. I call this area the transducing gate.

I contemplate using different types of records, such as the following:

1. records in which a thin film of opaque material is mounted on a transparent plastic strip, with controlled, focussed, coherent light from a laser used to burn or evaporate material from the film to form microperforations in the opaque material, 2. records in which a thin film of resin is placed on a transparent plastic strip, the resin includes a very finely divided material sensitive to ultra violet light, and which, when irradiated by ultra violet light decomposes, giving off a small quantity of gas. The gas is bound in the resin. But when the resin is warmed to a suitable temperature, the gas can expand and form tiny bubbles or vesicles. These are so numerous and so small that they diffract and scatter any light incident on the resin so that the strip is substantially opaque to transmitted light. A commercial film of this type is manufactured by the Kalvar Company of New Orleans, La.

3. Conventional silver halide film, particularly for the recording of pictorial spot patterns, other optical records, and 4. magnetic records.

This system of information storage is adaptable to many different kinds of strips, all of which can use magnetic or optical writing and/or reading. However, for the storing of digital information, the preferred high density system is to use the opaque layer-laser perforation system. I illustrate the principle in FIG. 1 by the optical system 14. This comprises a laser 52, a beam modulator 51 controlled by computer 43 modulating beam 50, which goes to a fixed mirror 48 where it is deflected vertically downward along the axis 36' of the rotating system. On the rotating disc 34 is mounted a mirror 46 and another mirror 44 that directs the beam through the optics 42 to the strip 28. The modulator 51 under control of a computer 43 exposes the strip to the focussed spot at spaced intervals to record the information. The reading of the information will be described in detail in connection with FIGS. 7 and 8.

One of the advantages of this invention is that a single scanning system can be used to sequentially or simultaneously read multiple information strips with very rapid access from one strip to another. Also, another feature of this invention fully described in my patents provides for indexing of the strip into multiple sections, with means on the strip handling means to read the section indicia and control the traverse of the strip so that a particular desired section is positioned in the transducer gate ready to be read.

In FIG. 2 I show schematically how a plurality of strips 28*a*, 28*b*, 28*c*, – 28*n* can be positioned radially with relation to the rotating disc 34 so that the strips are each positioned in the strip plane within the transducer gate. Also on the disc can be a corresponding plurality of optical elements, 42*a*, 42*b* – 42*n*, each of which successively scan across each of the strips. Each of the optical elements 42 are adapted to read information on the strips, so that by making connection to the reading means (to be described in connection with FIG. 8) of any one, or all of the elements, at any one time, any one, or all of the strips can be read simultaneously or sequentially in a small fraction of the period of rotation of the disc. By increasing the size of the disc, as many strips as desired can be accommodated.

Figures 3, 4, 6, 12, 14:
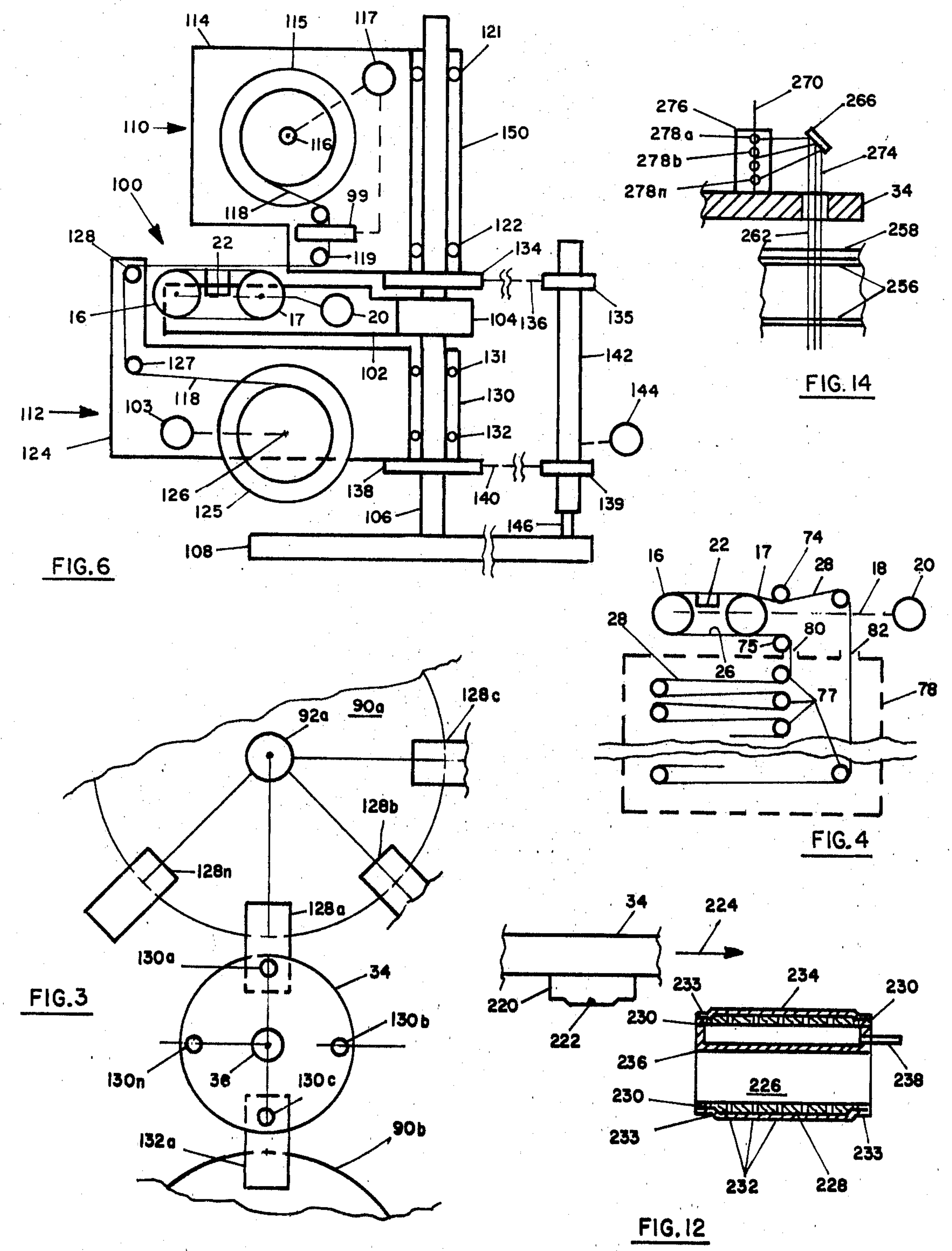
FIG. 3 illustrates an embodiment in which a single scanning means can sequentially contact a very large number of record strips.
FIG. 6 illustrates an embodiment of the strip handling means of FIG. 3.
FIG. 12 illustrates schematically an embodiment based on FIG. 1 adapted for magnetic transduction.
FIG. 14 illustrates a variation of FIG. 13.

In FIG. 3 I show another configuration of strips that permits a greater number of strips to be placed in operating relation with a single rotating optical system. Here a plurality of strips 128*a*, 128*b*, – 128*n* in strip handling means (not shown) are mounted on a rotating assembly 90*a* adapted for rotation about axis 92*a*. A single rotating optical system similar to that of FIG. 2 is positioned so that each of the strips 128 can be positioned radially under the optical system, by rotating the assembly 90*a*. If desired, (as shown by 90*b*) two or more rotating systems 90, can be used with a single rotating optical system scanning one strip on each of the rotating systems of strips and strip handling means. It is conceivable that as many as 12 or more strips may be used in FIG. 2. With FIG. 3, there conceivably might be as many as 6 rotating assemblies with 12 strip handling means on each. As will be discussed in more detail below, there may be as many as $10^{12}$ bits stored on 1,000 feet of strip 4 inches wide. So the system of FIG. 2 might handle up to $10^{13}$ bits and that of FIG. 3 as many as $10^{14}$ bits. Thus, this invention permits extremely large stores with rapid random access with non-contacting, non-destructive, and rapid readout.

Figure 5:
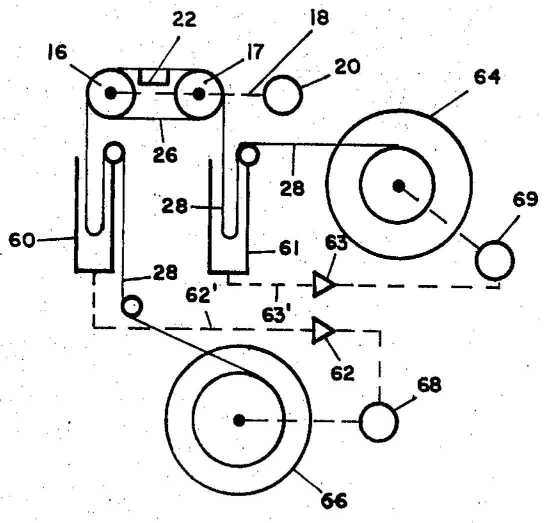
FIGS. 4 and 5 illustrate two possible systems for transporting the strips in the embodiment of FIG. 1.

In FIGS. 4 and 5 I illustrate schematically how the strips of FIG. 2 might be handled. FIG. 4 illustrates the case, where a continuous strip or loop is used. The strip 28 is a continuous loop and is stored in a box 78. The strip is supported on rollers 77 etc., and enters the box through opening 80 and leaves by opening 82. As in FIG. 1, the strip is traversed by the drum, belt and suction system, 16, 17, 22 and 26.

Although in normal readout and record operations the strip will be moving in one direction at constant speed, I contemplate that the drive system 20 can be controlled to drive backwards and forward at a high speed to present new volumes of information to be read. This is fully described in my issued patents U. S. Pat. No. 3,179,001 and 3,423,743.

In FIG. 5 I show another embodiment adaptable to the assembly of FIG. 2. Here the strip is traversed by the belt 26 as in FIG. 1. However, to obtain rapid response in positioning the strip to a desired trace, I provide two vacuum servo sensors 60, 61, into and out of which tape loops are driven as is well known in the art. The strip is longer in this case than in FIG. 4, and is unreeled from a storage reel 64 to a take up reel 66. The reels are driven by motors 69 and 68 respectively. The motors 68, 69 are controlled by the servo sensors 60, 61 through servo, amplifiers 62, 63, respectively, as is well known in the art.

In FIG. 6 I show an embodiment which is adaptable to the assembly of FIG. 3. It, like FIG. 5, makes use of reels for storage elements. However, in FIG. 6 I provide a single fixed traversing system 100, instead of providing a separate traversing assembly for each strip as in the case of FIGS. 4 and 5. The traversing assembly 100 is supported by clamp means 104 to a vertical rod or shaft 106 supported on plate 108. The reel support system is broken into two parts 110, 112 supported respectively above and below the traversing assembly 100. The upper reel 115 is supported on bearing 116 on vertical plate 114 which is fastened to cylinder 150 which is journaled on bearings 121, 122 about shaft 106. The lower (takeup) reel 125 is similarly supported on plate 124 fastened to cylinder 130 supported by bearings 131, 132 from shaft 106.

The two cylinders are driven by suitable means such as notched belts 136, 140 by pulleys 135, 139 mounted on rotating shaft 142 which is driven by motor 144. Although the two sections 110, 112 of the strip handling means are separate from each other, they are driven in synchronism. Thus a tape can be passed over idlers 119 and 128, and as the assembly rotates, separate strips will be positioned over the traversing system 100. Since there must be sufficient clearance between the strips and the top of the belt 26, it may be necessary to have means, not shown, for lifting the assembly 100 into contact with the strip 118. However, the suction which is provided to hold the strip to the belt may be enough to pull the strip down into contact with the belt.

What I have described so far, are embodiments including one or more separate strip of record media with traversing means to transport the strips from one storage element to another. The storage elements can be (for a long strip) separate reels. For short strips in the form of closed loops the storage elements can be the parts or openings through which the strip leaves and enters the storage chamber. As mentioned above, the traversing mechanism is primarily adapted to traverse the strip in planar motion, in the transducing gate, at constant speed. However, particularly in the case of FIG. 2, it is also adapted to rapidly traverse the strip (or loop) forward or backward in order to present any desired section of the strip medium within the transducing gate. The transducing gate can be called a writing gate, a reading gate, or simply a gate. In the embodiment of FIGS. 3 and 6, the strip can be traversed between reels by means of the motor drives 117, 103 of FIG. 6. Thus the strips can be positioned (off-line; that is, out of operating relation to the precise traversing system) to a desired section before the strip is positioned in the gate, that is, in operating relation to the optical system.

Figure 8:
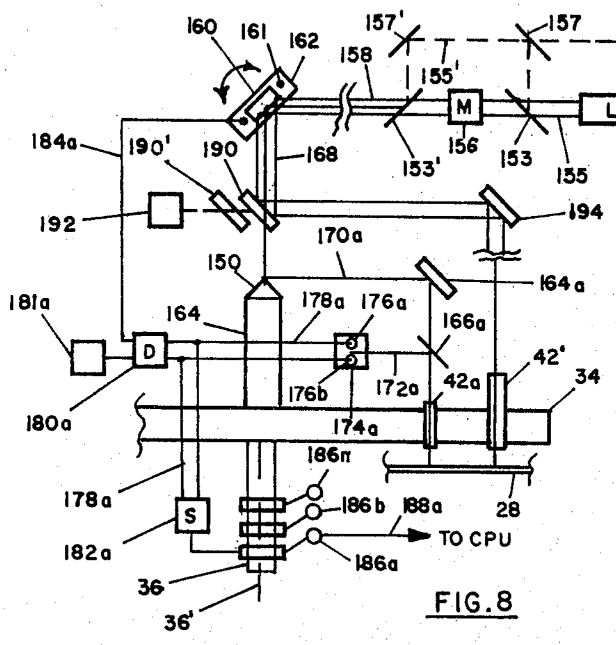
FIGS. 7 and 8 illustrate one embodiment of means for reading the spot record.
Figure 7:
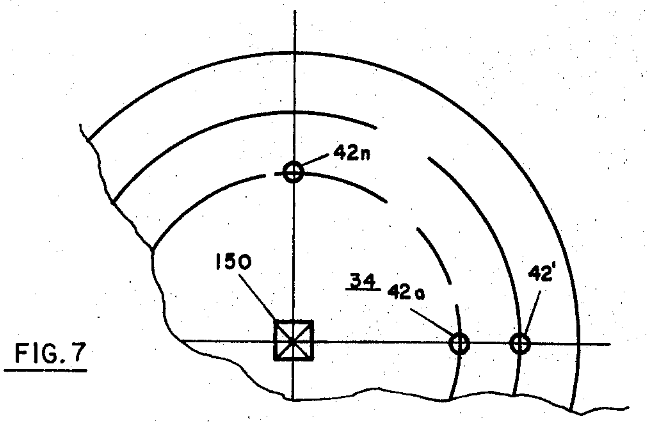

This system of information storage is adaptable to storing (writing and reading) digital spot information or pictorial spot information. In FIGS. 7 and 8 I describe an embodiment for a digital spot storage system. FIG. 7 is a plan view of the rotating disc 34 with a plurality of spaced optical elements 42*a*, 42*b*, 42*n*, 42′ etc. Over the rotating axis is a multi-faceted pyramidal prism 150.

FIG. 8 is an elevation view of the optical system. This comprises the rotating disc 34 with (one shown) optical element 42*a*. A laser source of coherent light 154 shines beam 155 through optical modulator 156 to control the intensity. This is very fast acting, adapted to pass very short pulses of intense light at rates up to 10–20 million pulses per second. The controlled light passes to mirror 160 thence downward along the axis 36′ to the prism 150. Here the single down-going beam breaks up into (in this case) four separate horizontal beams 170*a* etc. These go to mirrors 164*a* etc. that direct the beams downward through the optical elements 42*a*, etc., to the record. Consider the record to be a highly reflecting thin film of metal applied by evaporation to the top surface of a plastic strip. The spots are formed by using a very intense beam of coherent light. I show the recording mode with a mirror 190 (which may be only partially reflecting) inserted into position in the downgoing beam 168 by the magnetic positioning means 192. The position 190′ of the mirror 190 indicates the reading mode. In general, writing or recording will be done by one or possibly two optical elements, whereas reading can be done, and preferably will be done by many optical elements. However, reading can be done simultaneously with the writing operation. To facilitate this, part of the light from laser beam 155 is diverted around the modulator 156 as beam 155′ by means of beam splitters 153, 153′ and mirrors 157, 157′. Thus, with semi-transparent mirror 190, there will still be enough light in beams 170 to do the reading. Of course, instead of by-passing part of the light from laser 154 as shown, a separate laser 154′, preferably of a different wavelength than 154 can be used (with appropriate light filters as is well known in the art) to provide the reading light.

The principle portion of beam 168 is deflected to mirror 194 and then down through an optical element 42′. Although writing and reading can be done with a single optical element, it will generally (where multiple reading heads are used) be desirable to have a separate recording element.

Light in down-going beam 170 is brought to a focus by element 42*a* at the reflecting surface of 28. Light will be reflected upward through element 42*a* to beam splitter 166*a*, where part of the light (in beam 172*a*) goes to a two-element photoelectric sensor. Here the light divides between the two elements and two electric currents are generated, proportional to the intensities of the light falling on the two separate elements. If the spot (or track of spots) is centered under the beam 170*a*, the two currents on leads 178*a* from the sensor 174*a* will be equal. If not, the difference in the currents in the two leads will be a function of the displacement of the track from centering under the optics 42*a*.

The mirror 160 is mounted on a D'Arsonval galvanometer with coil 161 in a magnetic field provided by pole pieces 162. The currents in leads 178*a* go to a difference amplifier, D, 180*a* that puts out a control current on leads 184*a* to the galvanometer to tilt the beam by a minute amount which will displace the beam across the track sufficient to get the track in the center of the focussed beam. Thus sensor plates 176*a*, 176*b*, difference amplifier 180 and galvanometer 161 comprise a servo system that serves to align the track (as comprised of a line of dots) so that the reflected beam is centered on the reading sensor plates.

The same two current leads 178*a* are also connected to a sum amplifier S, 182*a*. The output of the sum amplifier shows a pulse of current each time a spot passes under the optics 42*a*. Therefore, using the light reflected from the record strip, it is possible to control the reading head to be continuously positioned on a desired track, and to read (at any instant) the presence or absence of a spot on the track. The essence of this portion of the system, namely the use of a two-element photo-sensing system, with difference amplifier and servo, and sum amplifier to read spots is fully described in my issued patent U. S. Pat. No. 2,820,907. The output of the sum and difference amplifiers can be taken from the rotating system by slip rings 186*a*, 186*b*, etc. as is well known or by other equivalent means.

Figure 9:
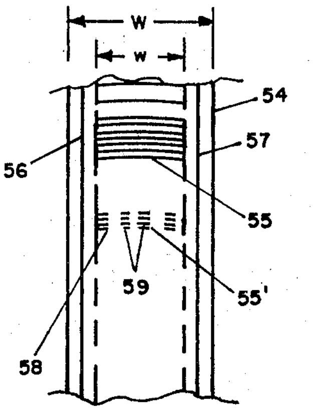
FIG. 9 illustrates one type of record medium and recording.

In FIG. 9 I show one embodiment of an information strip useful in this system. It comprises a strip of recording medium of width W. Over a narrower width *w*, are a plurality of tracks 55. These are portions of arcs of a radius corresponding to that of element 42*a*. In the spaces on either side are two longitudinal tracks 56, 57. On 56, for example, can be recorded (at relatively large scale) section indicia which can be read by relatively simple optical means as is well known in the art, (see my U.S. Pat. No. 2,820,907). Means 99 (FIG. 6) are placed on the strip handling means with servo means to control the drive motors 117, 103, to position any desired section of the strip in the reading gate. The second track can be used in a similar way to carry an information address index, which, once the desired section is found, will position the strip so that any desired information address is positioned in the reading gate.

Referring back to FIG. 9, I contemplate that each of the tracks will contain an address (including track number) 58 and clock bits 59 spaced apart a desired number of spaces which later will be filled in with information bit spots. These address and control bits can be pre-recorded on the strip, or can be recorded on the strip after installation into the recording system. Once the strips are prepared with tracks 58, 59, a given track can be recovered by:

a. positioning the strip to a desired section (which includes the desired information), b. searching for the desired address in the section. If the sections are small enough this step may not be necessary, c. reading the track number, and determining in which direction and how far the strip is to be moved, and causing the traversing system to reposition the strip closer to the desired track.

Figure 10:
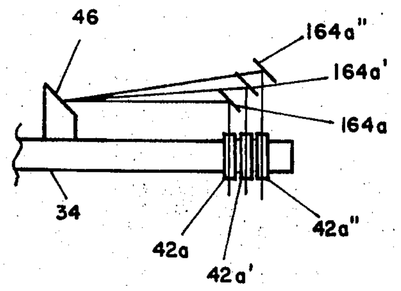
FIG. 10 illustrates a variation of FIG. 8.

Since the track spacing is very small (it may be as small as 0.0003 inch) it is not practical to move the strip physically by steps of one track spacing. By making the optical element 42*a* large enough in diameter, and by the use of the galvanometer controlled mirror 160, the reading beam can be rapidly moved over a range of 10–20 tracks or more. If a greater range is desired additional optical elements 42*a*', 42*a*'', as in FIG. 10, can be used with mirrors 164*a*' and 164*a*'' to extend the range.

Some of the art described in connection with the embodiments described, particularly as regards the optics, spots size, etc. follow the teachings of U. S. Pat. Nos. 3,314,073, 3,314,074, 3,314,075 and 3,474,457, and, of course, my issued patents and copending applications listed above. However, this system can work (although with larger spots and less packing density) with more conventional optics, without the teachings of these patents.

While, as described above this information can be used with any type of optical recording medium, I prefer a medium in which the recorded spot is optically visible as soon as it is recorded. In such a system it is not necessary to remove the strip and provide wet chemical processing. Aside from the convenience of such a direct record system, it permits the step of reading the recorded information simultaneously with or at least immediately after the information is recorded. This permits an immediate check on the quality of the record and permits instantaneous check of possible errors.

The system described above, of using a thin opaque film on the strip and burning or evaporating material away or changing the character of the layer over the area of the focussed spot of laser light, is one of the best as regards the ability to read at the same time as the information is recorded. However, there are other types of record media that have this advantage, such as photo-chromic materials that change color (or optical density) on being irradiated with light of a specified wavelength.

There is a particular kind of film marketed under the trade name of Kalvar film by the Kalvar Company of New Orleans, La. This film comprises a strip of clear plastic with a thin layer of a resin in which is dispersed, in molecular size quantities, a small amount of a material, which on irradiation by ultraviolet breaks down to release small quantities of gas. When the resin is heated to a temperature at which the resin softens (at about 250° F.) the gas is permitted to expand and form a series of tiny vesicles. These little volumes of gas are uniformly distributed over the area previously exposed and they form a series of light scattering centers. So the record that was quite transparent before exposure and heating, after exposure by ultraviolet light and heating, becomes quite opaque, since the incident light is scattered back instead of being transmitted through the resin layer.

Normally the pattern to be recorded is provided in the distribution of light in the ultraviolet beam. The record is then heated over its entire surface to "fix" the pattern. I contemplate doing the reverse. That is, I will pre-expose the entire record surface with ultraviolet light, and then with a high energy optical beam I will heat an area where a spot is to be recorded. Thus, when the spot is heated, or at least very shortly thereafter the vesicles will be formed and the record made. If the time delay to form the spot is very short, the reading means 174 (FIG. 8) can be used to record the spot made by optics 42*a*. However, if there is some small delay, a succeeding reading means associated with optics 42*n*, for example, or 42*c*, can be used to read the spot.

Figure 11:
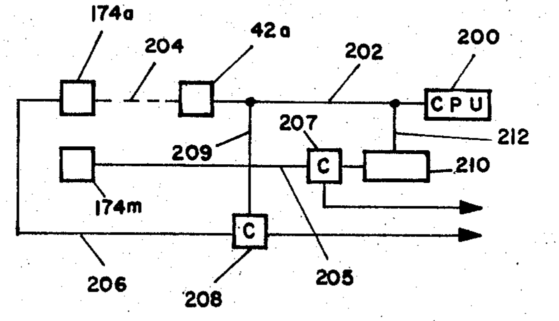
FIG. 11 illustrates an embodiment for simultaneously reading two strips and comparing the information read.

Referring to FIG. 11, I show a central processing unit 200 as a source of signals to be recorded. The signals go by means 202 to control the recording beam at 42*a*. Through the record medium and recording, schematically shown as dashed line 204, the reading means 174*a* gets the same signals as recorded. These go by lead 206 to a comparison circuit well known in the art (and used in great profusion in conventional computer systems), which compares the read signal on 206 with the signal to the recorder on 202, by lead 209. On the other hand, if there is some delay in the actual formation of the spot, such as due to the migration of the gas through the resin, it may be necessary to read the recorded spot with a later reading means 174*n*, using comparator 207 that gets its second signal from storage means 210 that temporarily stores the signal on line 212 that went to record head 42*a* on lead 202. The storage 210 can be a magnetic recorder or other well known types of time delay devices.

It is possible also to use a film having a layer of very small opaque capsules of appropriate marking chemicals. When the laser beam hits a capsule, the envelope will be evaporated and destroyed and the chemical inside will be liberated to mark the surface. This is described in U. S. Pat. No. 3,351,948 issued Nov. 7, 1967.

Most of the preceding description is related to optical recording of digital spot patterns. I will now illustrate how this storage system can be used to record and read magnetic digital spot patterns. This is illustrated in FIG. 12. Mounted on the rotating transducing means 34 (viewed radially) and moving in the direction 224, is a magnetic transducer assembly 220, with recording gap 222. In the strip traverse means, roller 226, belt 228 and recording strip 234 are shown in section (viewed from the axis of rotation 36'). I have shown the belt 228 with its edges thinned, 230. The perforations 232 through which the vacuum in container 236 is effective, extend out to the edges of the tape. Thus the edges of the strip 233 are depressed below the level of the main central portion of the strip. The spacing between the strip plane and the transducer plane is adjusted (by means not shown but well known) so that the magnetic head 220 exerts the desired pressure on the surface of the strip. Other equivalent systems can be used, of course, I anticipate using at least as many heads 220 spaced around the axis of the rotating transducer means as there are strips to be scanned. Thus each of the strips can be scanned simultaneously or sequentially.

This invention is also adaptable to the storage and retrieval of pictorial spot patterns. These can be of 2 kinds; (1) pictorial patterns such as micro-photographs of documents or pictures, and (2) multiple spot patterns that do not directly replicate actual documents or pictures, but comprise digital spot patterns coded on the record in one of many possible ways, such that by proper decoding will present to a scanning system the recorded digital spot patterns. Consider first type (1).

Figure 13:
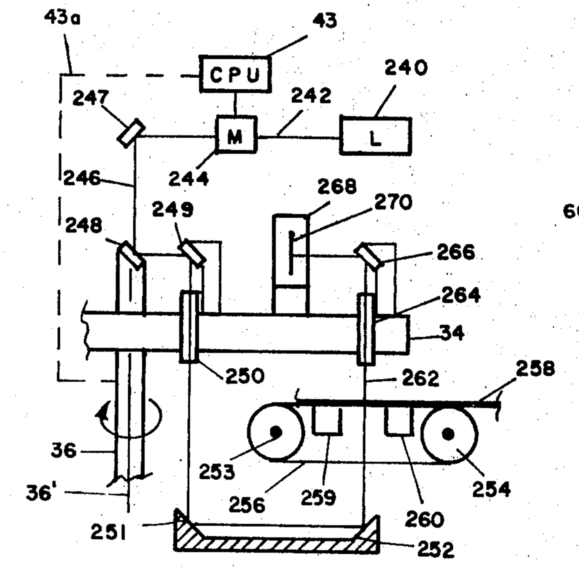
FIG. 13 illustrates the embodiment of FIG. 1 modified for reading the optical record by transmitted light.

In FIG. 13 I show schematically an embodiment patterned after FIGS. 1 and 8. I show the rotating transducer means 34 and shaft 36. Also the strip 258, cylinders 253, 254, perforated belt 256 and two vacuum chambers 259, 260. In this embodiment the strip carries information in the form of microfacsimiles of pictorial documents. These will be microfilm frames of small size and great optical reduction. They will be arrayed across the strip in arcuate tracks so that a scanning optics can photograph each picture "on the fly", that is, while the disc 34 is rotating and the strip is moving.

To do this I make the belt 256 out of a transparent plastic of high tensile strength, and the vacuum system 259, 260, is divided so that an optical path is available across the strip between the two parts. A laser 240 puts out beam 242 to optical modulator 244. The beam 246 then goes to mirrors 247, 248 and 249 from which it is directed vertically downward through optics 250. The output beam then goes to mirrors 251, 252 which direct the beam upward through the belt 256 to back-illuminate the strip 258. The mirrors 251 and 252 are as long (perpendicular to the plane of the drawing) as the strip is wide so that any one of the pictures across the strip can be illuminated at the proper time as 34 rotates.

Simultaneously, the trans-illuminated picture on strip 258 is viewed by optics 264, which with mirror 266 forms an image of the picture on the plane 270 of a recorder 268. Recorder 268 can be a film camera and the plane 270 can represent the sensitive emulsion surface of a film. Thus, each time the laser light is pulsed to illuminate a picture on strip 258, an image of the picture will be recorded. This will require precise time control of the modulator in relation to the angular position of the disc, and the address (or position) of the desired picture on the strip. This is indicated schematically by the computer C, 43 connected to the modulator, and means shown as dashed line 43*a* from the rotating shaft 36 entering position information into the computer.

It is possible to combine on one strip both pictorial and digital information, in which case the optics 42 (FIG. 1) might be placed at a different radius, or at a different azimuth, than the optics 250, 264. However, I would prefer to use a separate strip and strip handling means for the pictorial information.

It will, of course be clear that the system of FIG. 13 can be used to read digital spot patterns by transmitted light.

In my copending applications Ser. Nos. 612,698 and 721,998, described above, I describe different types of multiple spot patterns which can be detected by optical means, such as by irradiation with coherent light. Thus, by irradiating one of these patterns, a virtual image of a previously recorded (coded) information spot, or spot pattern, will be formed, and can be detected. These coded patterns, such as swept frequency, grating or holographic patterns, etc. have particular value in the error free storage of information. It is part of this invention to include these types of coded patterns.

To decode and detect the information in these patterns I use the embodiment of FIG. 14 which represents a modification of part of FIG. 13. One of the benefits of this coded recording is that the decoding can be done without optics, simply by irradiation of the film. So, the optics 264 is removed, and in the plane 270 I place a plurality of photoelectric transducer means 278*a*, 278*b* etc. to detect the reconstructed described in my copending application Ser. No. 278,979, entitled: Information Systems Using Arrays of Multiple Spot Patterns, filed 8/9/72 as a continuation of copending application Ser. No. 67,135 of the same title filed 8/26/70, now abandoned, which was a continuation-in-part of Ser. No. 612,698, filed 1/30/67, now U. S. Pat. No. 3,550,085 Systems Using Arrays of Multiple Spot Patterns.

This invention is novel in the manner in which a plurality of transducing elements interact with a plurality of information strips whereby an information record of high packing density can be recorded and read, and a very large multiple strip storage can be placed "on line," so that any desired portion can be accessed rapidly on an essentially random basis.

The storage can be magnetic or optical. The storage can be digital or analog, and the optical storage furthermore can comprise photomicrographs of documents, or pictorial patterns which are coded representations of digital information, which can be decoded optically. The recording medium can be conventional silver halide photographic film, Kalvar type and photo-chromic film, and media which can be altered by irradiation by a high energy beam of coherent radiation.

While I have disclosed several embodiments of my invention, there are many other embodiments which are possible based on the principles of this invention, all of which are felt to be part of this invention, the scope of which is to be determined from the scope of the appended claims.

I claim:

1. A high density multiple spot information storage system in which information is stored on a strip medium in the form of patterns of closely spaced spots of recognizable character, different from that of said strip, and adapted to be recorded and read by transducing means, comprising:

a. a plurality of strips in a plurality of strip-handling means for storing and traversing a plurality of strips from a plurality of first storage elements to a plurality of second storage elements;

b. a plurality of strip traversing means intermediate said first and second storage elements for traversing said strips at constant speed with each of said strips positioned in the same predetermined strip plane within predetermined transducing gates;

c. single rotating scanning transducing means adapted to successively scan each of said strips in a direction substantially perpendicular to the axes of said strips, in a scanning plane parallel to and precisely spaced from said strip plane, each of said strips positioned in a radial plane through the axis of rotation of said scanning transducer means, and said transducing gates at substantially the same radius from said axis of rotation;

d. means to relatively transduce information between said transducing means and said strips; and wherein;

each of said plurality of strips are substantially alike, and each have said patterns of spots representing stored information recorded thereon, said scanning transducer means adapted to read said recorded information, whereby as said transducing means sequentially scans across each of said strips, said transducer will sequentially read the information on each strip.

2. Apparatus as in claim 1 in which said transducing means is magnetic.

3. Apparatus as in claim 1 in which said transducing means is optical.

4. Apparatus as in claim 3 including means for detecting the light back scattered from said strip in the areas of said spots, whereby said spots can be read.

5. Apparatus as in claim 3 including means for detecting the light transmitted through said strip in the areas of said spots.

6. Apparatus as in claim 1 in which said scanning means comprises means to rotate at least one optical element so that its optical axis is parallel to and spaced from its axis of rotation, which axis of rotation is perpendicular to said strip plane.

7. Apparatus as in claim 6 including a plurality of said optical elements in the same plane and spaced at equal angles around said axis of rotation, whereby as said strip is traversed longitudinally in said strip plane, said plurality of elements will sweep out a plurality of parallel arc-like traces across said strip.

8. Apparatus as in claim 1 including a plurality of strips in a plurality of strip handling means, said handling means mounted in a rotating assembly adapted for rotation about an axis parallel to the axis of rotation of said scanning transducing means, whereby by rotating said rotating assembly, each of said plurality of strips will be sequentially presented to said scanning means.

9. Apparatus as in claim 8 including a single strip traversing means in fixed relation to said scanning transducer means and adapted to be placed sequentially into operating relation to each strip as said rotating assembly of strip handling means is rotated.

10. Apparatus as in claim 8 including a plurality of rotating assemblies symmetrically placed with respect to the axis of rotation of said scanning transducing means, each assembly including a plurality of strip handling means, at least one strip handling means in each rotating assembly in transducing relation to said rotating transducing means.

11. Apparatus as in claim 1 in which said strip means comprises a transparent base strip with a thin layer of opaque material deposited on one surface, and including laser radiation means and means to focus said laser radiation to a small spot substantially at the surface of said opaque material, thereby to modify said opaque material, over the area of said spot focus, and form a spot of different character in said opaque material.

12. Apparatus as in claim 11 in which said opaque material comprises a thin metallic film, and said modification comprises evaporation.

13. Apparatus as in claim 1 including means substantially simultaneously to record said spots on said strip and to read said spots substantially as they are recorded.

14. Apparatus as in claim 1 in which said strip record medium comprises a base layer of plastic plus a thin film of resin carrying a finely divided material sensitive to ultraviolet light, which on irradiation by ultraviolet light decomposes to produce minute quantities of a gas which is bound within the resin, such that when said resin is heated the gas is permitted to expand to form minute vesicles, which act to diffract and scatter light incident upon the medium in the area of said vesicles.

15. Apparatus as in claim 14 including means to record on said strip including means to flood a portion of the recording area with ultraviolet light, whereby said gas is released, and including means to heat the strip over the area of a spot including a focus beam of coherent light of high intensity, whereby said resin will be heated and said gas permitted to expand to form light scattering vesicles within said resin.

16. Apparatus as in claim 1 in which said patterns of spots comprise pluralities of spots each of the same character, arranged in a predetermined matrix of possible spot positions, each spot representing one bit of information.

17. Apparatus as in claim 16 in which said transducing means is adapted to transduce each of said spots individually and sequentially.

18. Apparatus as in claim 1 in which said information is recorded in the form of arrays of patterns of spots, each of which patterns comprise pluralities of spots arranged in said patterns.

19. Apparatus as in claim 18 in which said transducing means is adapted to transduce a plurality of spots in said patterns simultaneously.

20. Apparatus as in claim 19 in which said transducing means comprises camera means.

21. Apparatus as in claim 19 in which said transducing means includes coherent optical means.

22. Apparatus as in claim 18 in which said patterns are swept frequency patterns.

23. Apparatus as in claim 18 in which said patterns are holograms.

24. Apparatus as in claim 18 in which said patterns are optical gratings.

25. Apparatus as in claim 1 including an equal number of transducing elements and strip handling means, arranged substantially equally spaced around the axis of rotation of said scanning transducer means, whereby a transducing element is in position to transduce information with each strip substantially simultaneously.

26. Apparatus as in claim 25 and including reading means to read the individual spots on each of a plurality of strips substantially simultaneously, and further including means to compare the readings of each of said plurality of reading means at each instant of time.

27. Apparatus as in claim 26 and including means to record on another strip substantially simultaneously, the result of said comparison.

28. Apparatus as in claim 1 in which said recording medium comprises a strip material with a thin layer of microcapsules of a chemical marking material, said capsules, when irradiated with a focussed beam of coherent light of high intensity are adapted to break, permitting the chemical material to mark said strip material.

29. The apparatus as in claim 1 including at least a second rotating scanning transducing means similar to and symmetrically placed with respect to said single rotating scanning means to simultaneously read information from said plurality of substantially similar strips by said corresponding plurality of rotating scanning transducing means.

30. In an information apparatus in which information is stored in the form of patterns of closely spaced spots arranged in two-dimensional arrays of possible spot positions on a plurality of strip record media and in which said spots are transduced by relatively moving said strips and a single rotating transducing means, in which said transducing means scans in sequence each possible spot position in said arrays, the method of producing records comprising the steps of;

a. preparing a first and a second strip record medium and placing said first and second strips in first and second strip handling means, respectively, placing said first and second strip handling means in similar positions with respect to said rotating transducing means, such that said strips are in the same strip plane;

b. traversing said first and second strips longitudinally in said strip plane at constant speed within similarly positioned transducing gates;

c. sequentially scanning said strips by means of said transducing means rotating about an axis perpendicular to said strip plane, whereby said transducing means will scan in a transducing plane parallel to and precisely spaced from said strip plane, across said strips, within said transducing gates; and d. transducing said information between said rotary transducing means and said strips; and wherein each of said plurality of strips are substantially alike, and each are of such a structure as to be recorded upon by said transducer, to produce said patterns of spots representing information to be stored, said scanning transducer means adapted to record said patterns of spots, whereby as said transducing means sequentially scans across each of said plurality of strips, said transducer will sequentially record on each strip.

31. The method as in claim 30 including the additional steps of:

a. scanning a first track across said first strip and temporarily storing the information read from said first track, b. scanning a first track of said second strip, c. comparing the information read from said second strip with the stored information from said first strip, and d. utilizing the result of said comparison.

32. The method as in claim 31 including the additional steps of:

a. preparing a third strip medium and placing it in position with respect to said transducing means similar to said first strip, such that said third strip is in the same plane as said first and second strips, b. traversing said third strip longitudinally at constant speed within said strip plane, and c. recording on said third strip the results of said comparison.

33. The method as in claim 30 including at least a second rotating scanning transducing means similar to and symmetrically placed with respect to said single rotating scanning means to simultaneously write information on a plurality of substantially similar strips by said corresponding plurality of rotating scanning transducing means.

34. A high density multiple spot information storage system in which information is stored on a strip medium in the form of patterns of closely spaced spots of recognizable character, different from that of said strip, and adapted to be recorded and read by transducing means, comprising:

a. a plurality of strips in a plurality of strip-handling means for storing and traversing a plurality of strips from a plurality of first storage elements to a plurality of second storage elements;

b. a plurality of strip traversing means intermediate said first and second storage elements for traversing said strips at constant speed with each of said strips positioned in the same predetermined strip plane within predetermined transducing gates;

c. Single rotating scanning transducing means adapted to successively scan each of said strips in a direction substantially perpendicular to the axes of said strips, in a scanning plane parallel to and precisely spaced from said strip plane, each of said strips positioned in a radial plane through the axis of rotation of said scanning transducer means, and said transducing gates at substantially the same radius from said axis of rotation;

d. means to relatively transduce information between said transducing means and said strips; and wherein;

each of said plurality of strips are substantially alike and each are of such a structure as to be recorded upon by said transducer, to produce said patterns of spots representing information to be stored, said scanning transducer means adapted to record said patterns of spots, whereby as said transducing means sequentially scans across each of said plurality of strips, said transducer will sequentially record on each strip.

35. The apparatus as in claim 34 including at least a second rotating scanning transducing means similar to and symmetrically placed with respect to said single rotating scanning means to simultaneously record information on said plurality of substantially similar strips by said corresponding plurality of rotating scanning transducing means.

36. In an information apparatus in which information is stored in the form of patterns of closely spaced spots arranged in two-dimensional arrays of possible spot positions on a plurality of strip record media and in which said spots are transduced by relatively moving said strips and a single rotating transducing means, in which said transducing means scans in sequence each possible spot position in said arrays, the method of producing records comprising the steps of;

a. preparing a first and a second strip record medium and placing said first and second strips in first and secons strip handling means, respectively, placing said first and second strip handling means in similar positions with respect to said rotating transducing means, such that said strips are in the same strip plane;

b. traversing said first and second strips longitudinally in said strip plane at a constant speed within similarly positioned transducing gates;

c. sequentially scanning said strips by means of said transducing means rotating about an axis perpendicular to said strip plane, whereby said transducing means will scan in a transducing plane parallel to and precisely spaced from said strip plane, across said strips, within said transducing gates; and d. transducing said information between said rotaty transducing means and said strips; and wherein;

each of said plurality of strips are substantially alike and each have said patterns of spots representing stored information recorded thereon, said scanning transducer means adapted to read said recorded information, whereby as said transducing means sequentially scans across each of said strips, said transducer will sequentially read the information on each strip.

37. The method as in claim 36 including at least a second rotating scanning transducing means similar to and symmetrically placed with respect to said single rotating scanning means to simultaneously read information from said plurality of substantially similar strips by said corresponding plurality of rotating scanning transducing means.

* * * * *